Feb. 27, 1968  R. W. MURRAY  3,370,623
FLUID DISPENSING DEVICE
Filed May 21, 1965  6 Sheets-Sheet 1

INVENTOR.
ROBERT W. MURRAY
BY Moore, White & Burd
ATTORNEYS

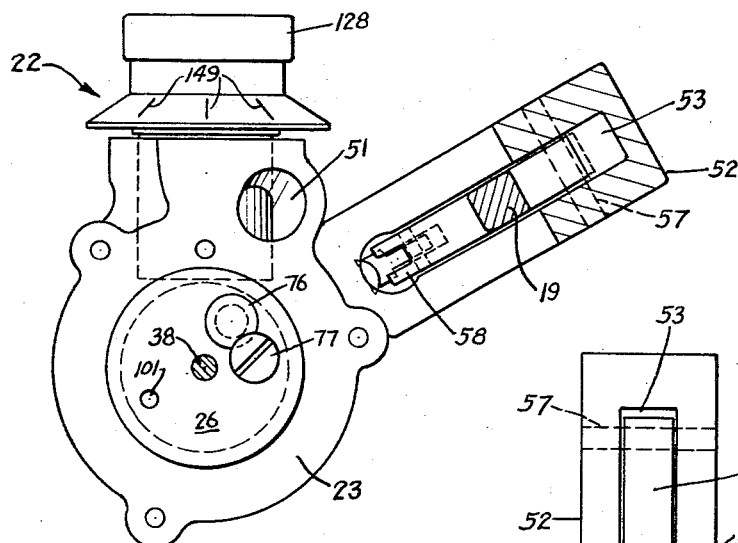
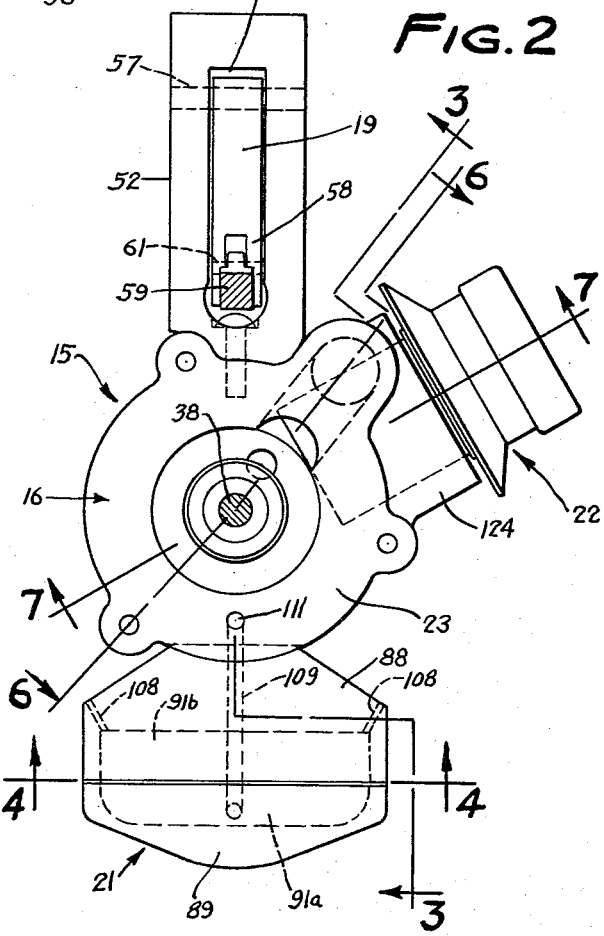
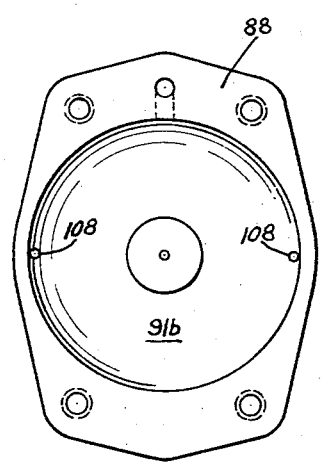

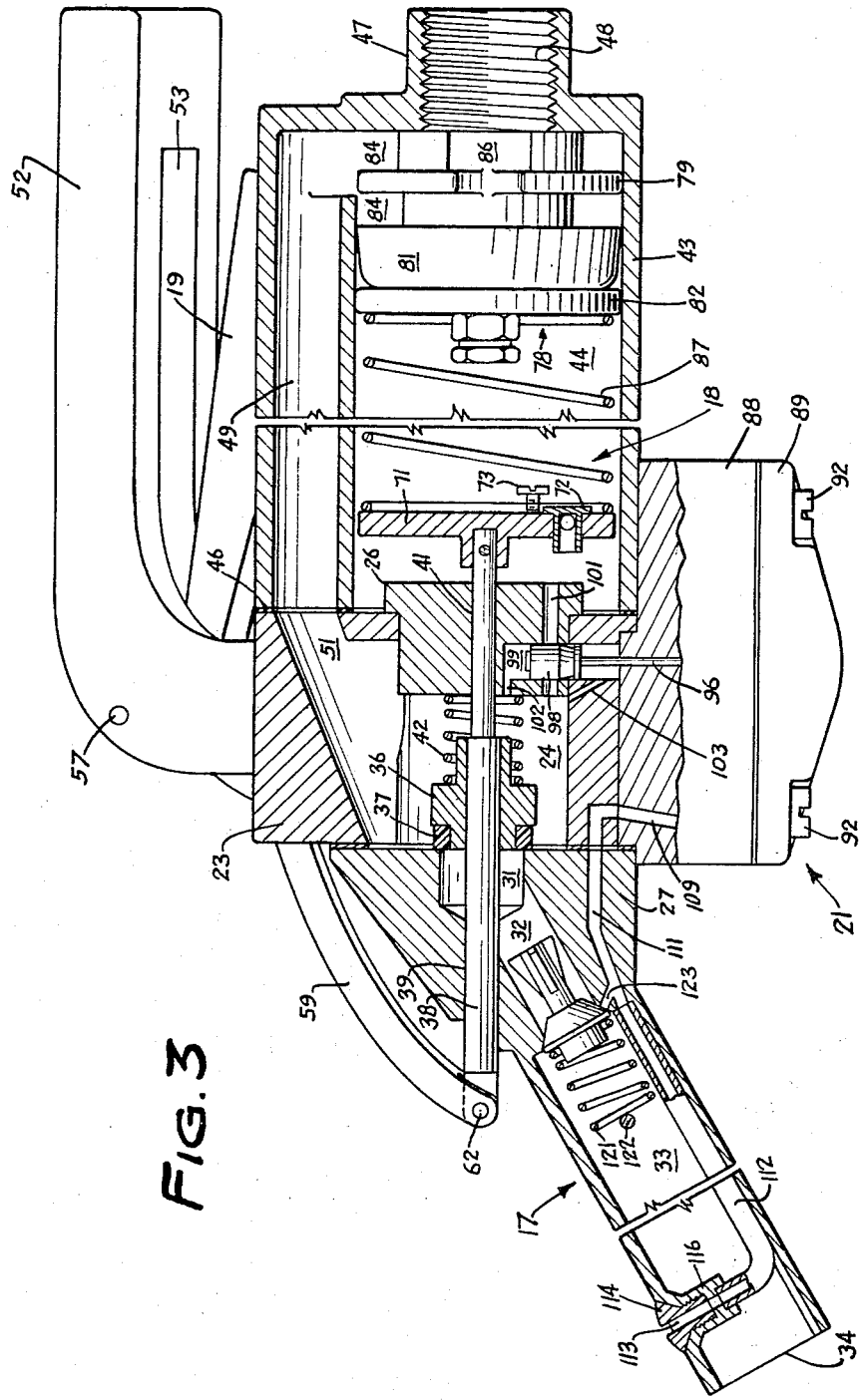

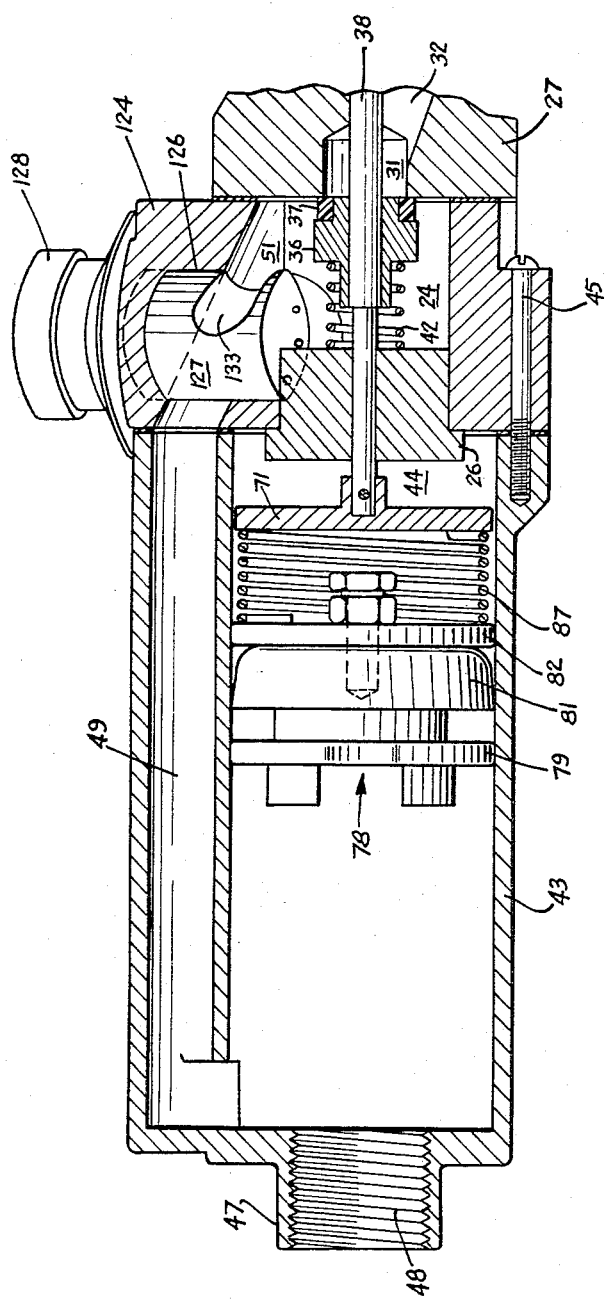

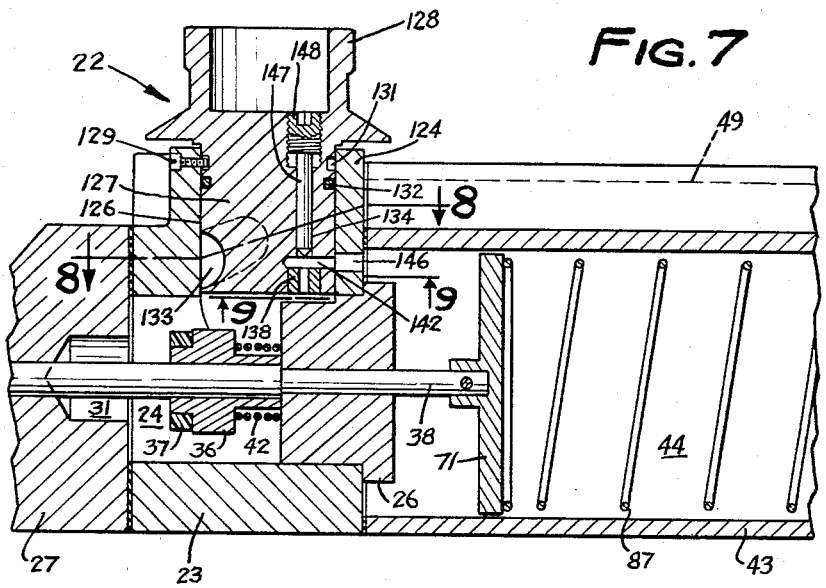
FIG. 7
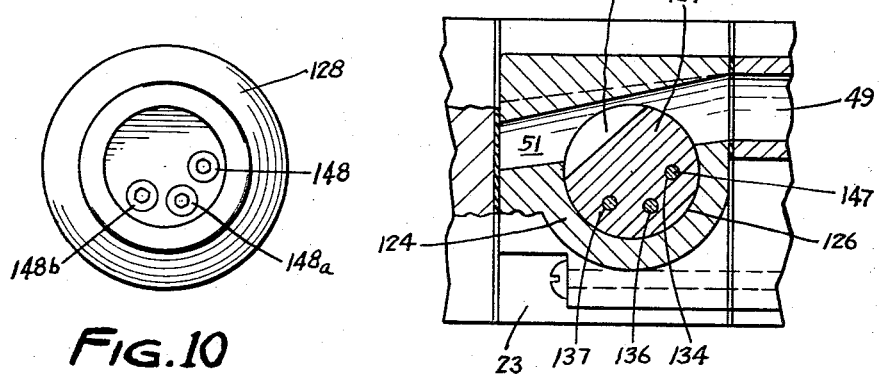
FIG. 10
FIG. 8
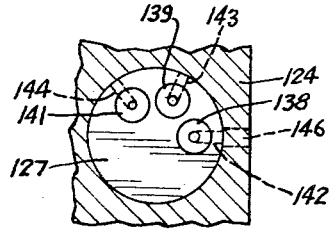
FIG. 9

Feb. 27, 1968  R. W. MURRAY  3,370,623
FLUID DISPENSING DEVICE
Filed May 21, 1965  6 Sheets-Sheet 6

INVENTOR.
ROBERT W. MURRAY
BY
Moore, White & Beard
ATTORNEYS

_United States Patent Office_  3,370,623
Patented Feb. 27, 1968

1

3,370,623
FLUID DISPENSING DEVICE
Robert W. Murray, Brooklyn Park, Minn., assignor to American National Valve Corporation, Minneapolis, Minn., a corporation of Minnesota
Filed May 21, 1965, Ser. No. 457,699
17 Claims. (Cl. 141—206)

ABSTRACT OF THE DISCLOSURE

A dispensing nozzle for liquids, primarily for dispensing gasoline, including a valve which is capable of shutting off automatically either when the tank is full or when some predetermined volume or value of liquid has been measured and dispensed. The shut-off mechanism is actuated by a timer piston which is subjected to the fluid pressure of the liquid being dispensed and whose rate of travel is determined by the size of a bleeder hole which can be varied to permit the nozzle to dispense the predetermined amount of liquid.

---

This invention relates to a device for and method of dispensing fluid into a container. More particularly the invention relates to a combination valve and nozzle assembly which automatically closes when the container is substantially full of liquid and is adjustable to meter out predetermined volumes of liquid, such as gasoline or a similar liquid fuel, less than a tank full and then automatically shut-off.

In large volume cash sale filling stations it is common practice for customers to order less than a full tank of gasoline for their motor vehicles. For convenience of payment these sales are normally made in $1.00, $2.00 or $3.00 worth of gasoline. In sales above $3.00 the customers usually fill the tank with gasoline. In the case of a customer ordering a full tank of gasoline, automatic nozzle and valve assemblies are avilable to shut-off the flow of gasoline when the tank becomes substantially full. When the customer orders less than a full tank the attendant must either hand fill the tank or leave the nozzle in the tank fill tube operating at a slow rate and keeping close attention to the indicator on the gasoline pump. This inhibits his attention to other service functions such as cleaning windows, checking the oil, battery and radiator, and servicing the windshield washer. The attendant is faced with the alternative situation of dispensing more gasoline than has been ordered or neglecting the servicing of the motor vehicle.

It is the object of this invention to provide an improved combination nozzle and valve assembly which is constructed so as to permit the operator to pre-set the valve unit controls so as to dispense predetermined amounts of liquid fuel such as gasoline which are equivalent to $1.00 and multiples thereof in value and which may be preset to dispense liquid fuel until the tank is substantially full and then automatically shut-off.

Another object of the invention is to provide a combination nozzle and valve assembly which is mechanically held in an open position to dispense liquid into a container in controlled amounts and automatically closes when a predetermined amount of liquid has been dispensed into the container.

Another object of the invention is to provide a valve unit with a valve member which is releasably locked in an open position to dispense liquid into a container and automatically moves to a closed position when the container is substantially full of liquid.

A further object of the invention is to provide an improved method of controlling the dispensing of liquid into a tank.

2

Still another object of the invention is to provide a liquid dispensing nozzle and valve assembly with a control system for controlling the amount of liquid dispensed from the assembly and operable to automatically shut-off the valve when the nozzle unit contacts the top of the dispensed liquid in the tank.

A further object of the invention is to provide a liquid dispensing nozzle and valve assembly with a control system having a single adjustable member for selecting the amount of liquid to be dispensed by the nozzle and valve assembly.

Still a further object of the invention is to provide an improved nozzle and valve assembly for dispensing predetermined amounts of fluids including hydraulic fluid and pneumatic fluid.

A further object of the invention is to provide a compact and rugged liquid dispenser which has a minimum number of working parts and is relatively simple and economical in construction, maintenance free, and reliable and efficient in use.

Other objects of the invention will become apparent as the description proceeds.

To the accomplishment of the foregoing and related ends, this invention comprises the features hereinafter fully described and particularly pointed out in the claims. The following description sets forth in detail a particular illustrative embodiment of the invention, this being indicative, however, of but two of the various ways in which the principles of the invention may be employed. The invention is illustrated by the accompanying drawings in which the same numerals refer to corresponding parts and in which:

FIGURE 2 is a sectional view taken along the line 2—2 of FIGURE 1;

FIGURE 3 is a sectional view taken along the line 3—3 of FIGURE 2;

FIGURE 4 is a sectional view taken along the line 4—4 of FIGURE 2;

FIGURE 5 is a sectional view taken along the line 5—5 of FIGURE 1;

FIGURE 6 is a sectional view taken along the line 6—6 of FIGURE 2;

FIGURE 7 is a sectional view taken along the line 7—7 of FIGURE 2 showing the flow control valve in the restricted flow position and the timer piston urged adjacent the control piston by the liquid supply pressure;

FIGURE 8 is a sectional view taken along the line 8—8 of FIGURE 7;

FIGURE 9 is a fragmentary sectional view taken along the line 9—9 of FIGURE 7;

FIGURE 10 is a plan view of the control knob shown in FIGURE 7;

Figure 1:
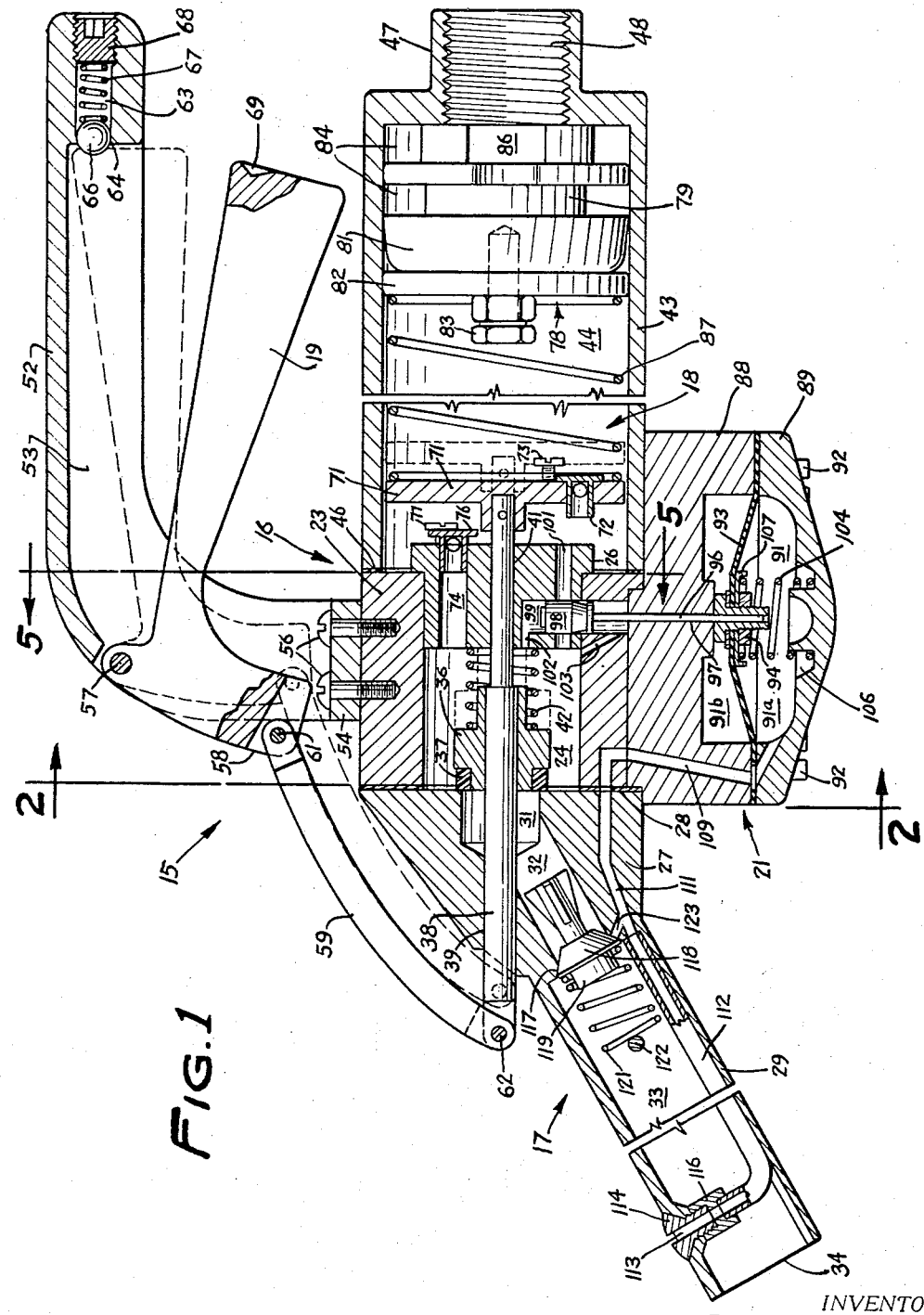
FIGURE 1 is an elevational view partly in section of an automatic shut-off nozzle and valve assembly constructed in accordance with this invention.

Referring to the drawing there is shown in FIGURES 1, 2 and 3 the nozzle and valve assembly of this invention indicated generally at 15. This assembly comprises a valve unit 16 for regulating the flow of liquid, such as gasoline and fuel oil into a nozzle unit 17 for discharge into a container or tank such as the gasoline tank of a motor vehicle. The valve unit 16 has an open position for directing liquid into the nozzle unit 17 and a closed position blocking the flow of liquid into the nozzle unit.

A control system indicated generally at 18 having control mechanisms 21 and 22 operates the valve unit 16 to regulate the flow of liquid into the nozzle unit. The system 18 includes a lever 19 manually moved into a locked position to hold the valve unit in the open position. The valve unit 16 is automatically closed in response to the operation of a vacuum operated control mechanism 21 which permits the valve unit 16 to close when the tank receiving the liquid is substantially full of liquid.

The control system 18 includes an adjustable fluid delay control mechanism 22 which operates to automatically close the valve unit 16 after a period of time sufficient to discharge a predetermined amount of liquid from the nozzle unit. The control mechanism 22 is a fluid timer which functions to automatically close the valve unit at or just prior to a selected dollar unit of liquid. In practice, the control mechanism 22 is adjusted to close the valve unit a few cents prior to the selected dollar unit so as to avoid the dispensing of more liquid than is desired. When the fluid delay control mechanism 22 is utilized the vacuum operated mechanism 21 is inoperative unless the tank is filled with liquid before the selected amount of liquid has been discharged through the nozzle unit 17. In this event the vacuum operated control mechanism 21 will automatically shut-off the valve unit 16 thereby preventing the liquid from spilling out of the tank.

The valve unit 16 comprises a body 23 having an axial bore forming a chamber 24. A cap 26 inserted into the bore fits therein with a tight fit to close the rear end of the chamber 24. The opposite end of the chamber 24 is closed with the nozzle unit 17.

Included in the nozzle unit 17 is a head 27 which is secured to the forward end of the valve body 23 by bolts (not shown). A gasket 28 is interposed between the adjacent faces of the head 27 and valve body 23 to prevent the leakage of liquid from the chamber 24. A downwardly extended tubular neck 29 is integral with the head 27. The head 27 has a first passage 31 open to and in axial alignment with the chamber 24 and a second passage 32 open to the forward end of the first passage 31 and passage 33 in the tubular neck 29. Passages 31, 32 and 33 provide a route for the flow of liquid from the chamber 24 to the discharge end 34 of the nozzle unit 17.

The flow of liquid from the chamber 24 is controlled by a valve member 36 having a sealing ring 37 on the forward end thereof. A rod 38 projects through the valve member 36 and positions the valve member 36 for axial movement in the chamber 24. The forward section of the rod 38 projects through a bore 39 in the nozzle head 27. The opposite end of the rod 38 is of reduced diameter and projects through a bore 41 in the cap 26. The rod 38 slides axially in the bores 39 and 41 and positions the valve member 36 and its sealing ring 37 in axial alignment with the first passage 31. The diameter of the passage 31 is smaller than the diameter of the ring 37 whereby the valve member 36 and the ring 37 close the inlet to the passage 31. A spring 42 positioned about the rod 38 in engagement with the valve member 36 and the cap 26 biases the sealing ring 37 into engagement with the head 27.

As shown in FIGURE 3, a tubular member 43 having a cylindrical control chamber 44 is attached by bolts 45 (FIGURE 6) to the valve body 23 and projects in a direction opposite from the nozzle unit 17. A gasket 46 is interposed between the adjacent faces of the valve body 23 and the cylindrical member 43 prevents leakage of liquid from chamber 44. The rear end wall of the cylindrical member 43 has an outwardly projected boss 47 having a threaded bore 48. In use, a flexible hose (not shown) from the supply of liquid, such as a pump, is coupled to the threaded bore 48 and provides the nozzle and valve assembly 15 with a continuous supply of liquid under pressure. The cylindrical member 43 has a passage 49 which goes around chamber 44. The passage 49 is open at one end to the chamber 44 adjacent the threaded bore 48 and open at the opposite end to an inlet bore 51 in the valve body 23. The bore 51 projects forwardly and downwardly and opens into the chamber 24. Thus, the liquid supplied to the assembly 15 flows into the chamber 44, through the passage 49 to the inlet bore 51 and then into the valve body chamber 24. From the chamber 24 the liquid flows into the nozzle unit 17 and is discharged therefrom into a tank or similar container.

To facilitate movement and positioning of the nozzle and valve assembly 15 a curved handle 52 having a longitudinal groove 53 and a flat base 54 is secured by bolts 56 to the top of the valve housing 23 as shown in FIGURE 1. The lever 19 has a bell crank shape and is pivoted by pin 57 to the curved portion of the handle 52 for movement into and out of the groove 53. The crank end 58 of the lever 19 is bifurcated and receives an end of a curved link 59. A pin 61 pivotally connects the crank end 58 of the lever 19 to the link 59. The opposite end of the curved link 59 is pivoted by a pin 62 to the forward end of the rod 38.

As shown in broken lines in FIGURE 1, the lever 19 pivots upwardly into the groove 53. This is normally achieved by positioning the hand about the handle 52 and pressing the lever up into groove 53. When the lever 19 is moved up into the groove 53 it forces the rod 38 in a rearward direction opening the valve member 36 against the biasing force of the spring 42. With the valve member 36 in the open position as shown in broken lines in FIGURE 1 the liquid in the chamber 24 flows into the passages 31 and 32 of the nozzle unit 17 and is dispensed therefrom into a tank.

When the holding force on the lever 19 is released the spring 42 biases the valve member 36 in a forward direction closing the passage 31. In order to hold the valve member in the open position the lever 19 is forced into operative engagement with a detent which functions as a mechanical lock and has a holding force which is greater than the biasing force of the spring 42. The detent includes a bore 63 in the outer end of the handle 52 longitudinally open to the groove 53. The bore 63 has an inwardly directed annular lip 64 for retaining a ball 66. A spring 67 positioned in the bore biases the ball 66 into engagement with the annular lip 64 thereby resiliently holding the ball in engagement with the lip 64 with a portion of the ball projected into the groove 53. A plug 68 threaded into the outer end of the bore 63 retains the ball 66 and spring 67 in operative relation in the bore 63. The outer end of the lever 19 has a recess 69 for receiving the projected portion of the ball 66 to releasably lock the lever 19 in the squeezed or folded position.

The valve member 36 is moved to the closed position and the lever 19 released from the holding action of the spring bias ball 66 by fluid pressure acting on a control piston 71 secured to the end of the rod 38 positioned in the control chamber 44. The piston 71 has a clearance fit with respect to the wall of the chamber 44 and carries a check valve 72 operative to permit the flow of liquid from the rod side to the head side of the piston. An adjustable stop 73 limits the movement of the check valve 72 in the piston 71. The check valve 72 is shown as a cup-shaped member having an enlarged base. A hole in the transverse wall opens into the cup-shaped member. The cup-shaped member is slidably disposed in a hole in the piston 71 with the stop 73 engageable with the portion of the base to limit movement of the cup-shaped member relative to the piston. This movement is sufficient to open and close the hole in the transverse wall to control the flow of fluid through the piston 71.

As shown in FIGURE 1, liquid from the chamber 24 is supplied to the control chamber 44 through a bore 74 in the cap 26. A check valve 76 is positioned in the outlet section or rearward portion of the bore 74 and functions to only permit the flow of liquid from the chamber 24 into chamber 44. A screw stop 77 attached to plug 26 is positioned to engage the check valve and limit its outward movement. Check valves 72 and 76 are identical in construction.

Slidably disposed in the cylindrical chamber 44 between the piston 71 and the boss 47 is a timer piston indicated generally at 78 having a body 79 carrying a cup-shaped annular seal 81. The seal 81 is clamped onto the forward end of the body 79 by a disc 82. A bolt and nut assembly 83 holds the disc 82 in assembled relation with the body 79. The body 79 has a pair of annular grooves 84 and a transverse groove 86 forming connecting passages to equalize the liquid pressure on the annular seal 81 and to provide for the free flow of liquid from the supply source into the passage 49. A spring 87 positioned axially in the chamber 44 engages the head side of the control piston 71 and the disc 82 of the timer piston 78. The spring 87 resiliently connects the timer piston 78 with the control piston 71 such that on movement of the timer piston 78 toward the control piston 71 an increasing force is applied to the control piston 71 urging it in a forward direction.

The valve member 36 is moved to the closed position in response to flow of liquid from the chamber 44 into the chamber 24. This flow is controlled by the vacuum operated control mechanism 21 which functions in response to the level of the liquid in the tank. Alternatively, the flow of liquid from the chamber 44 into the chamber 24 is controlled by the fluid delay control mechanism 22 shown in FIGURES 7 to 10.

Referring to FIGURES 1 and 3, the vacuum operated control mechanism 21 comprises a cup-shaped housing 88 secured to the bottom of the valve body 23 opposite the handle 52. The housing 88 opens in a downward direction and is closed by a cup-shaped cap 89 to form a chamber 91. Bolts 92 secure the cap 89 to the housing 88. A flexible diaphragm 93 is clamped between the cap 89 and housing 88 and divides the chamber 91 into a vacuum portion 91a and an atmospheric portion 91b. Clamped to the center of the diaphragm 93 is a nut and bolt assembly 94 connected to a rod 96 slidably positioned in a bore 97 in the base of the housing 88. The upper end of the rod 96 is secured to a piston 98 slidably positioned in a bore 99 in the cap 26 and the valve housing 23. The piston 98 functions to open and close an axial bore 101 in the cap 26 connecting the chamber 24 with the chamber 44. Bleed passages 102 and 103 open into the bore 99 on opposite sides of the piston 98 to eliminate the build-up of liquid pressure in the bore 99 adjacent opposite ends of the piston 98 during movement of the piston 98 to open and closed positions.

A coil spring 104 positioned in the vacuum chamber 91a biases the diaphragm 93 in an upward direction into the atmospheric chamber 91a formed by the housing 88 and thereby moves the piston 98 to the closed position blocking the passage of liquid through the bore 101. The lower end of the spring 104 is positioned in an annular recess 106 in the cap 89. The opposite end of the spring engages the flanged washer 107 carried by the nut and bolt assembly 94.

As shown in FIGURE 2, chamber 91b formed by the housing 88 is open to the atmosphere by a pair of passages 108. As best seen in FIGURE 1, chamber 91a formed by the cap 89 is open to the atmosphere by passage 109 in the housing 88, passage 111 in the valve body 22 and nozzle head 27 and tube 112 extended along the tubular neck 29 and terminating in alignment with an opening 113 in a screw 114 and connector nut 116. The screw 114 and nut 116 are clamped to the wall of the tubular neck 29 adjacent the discharge end 34. As long as the screw 114 is above the level of the liquid in the tank the chambers 91a and 91b on the opposite sides of the diaphragm 93 will be subjected to atmospheric pressure. Under these conditions the spring 104 will hold the piston 98 in the closed position blocking the flow of liquid from the chamber 44 into the chamber 24.

The discharge or lower end of the second passage 32 in the nozzle head 27 has a tapered valve seat 117 engageable with a conical surface 118 of a check valve 119. The check valve 119 is biased to a closed position by a coil spring 121 seated on the valve 119 downstream of the conical surface 118. The opposite end of the spring engages a transverse pin 122 carried by the tubular neck 29. The passage 111 is in fluid communication with the valve seat through a spur passage 123. A single passage is shown in the drawings, however, a plurality of passages circumferentially spaced about the valve seat 117 may be utilized to connect the valve seat 117 and passage 111. When the valve member 36 is in the open position the liquid flows through chamber 24 and passages 31 and 32 opening the check valve 119. As the liquid flows through the restricted annular space between the valve seat 117 and the conical valve surface 118 there is established a Venturi type flow which draws air through the spur passage 123. This air is supplied from the atmosphere through the tube 112 and the opening 113 when the discharge end 34 of the nozzle unit 17 is not blocked such as when the screw 114 is above the level of liquid in the tank.

When the opening 113 is blocked the liquid moving past the check valve 119 draws air from the vacuum chamber 91a via the passages 109 and 111. The evacuation of air from chamber 91a creates a vacuum force which moves the diaphragm 93 in an outward direction into the chamber 91a thereby moving the piston 98 in the bore 99 and opening the passage 101. With the passage 101 open the fluid in the chamber 44 flows into the chamber 24 because the pressure of the fluid in the chamber 44 is substantially greater than the pressure in the chamber 24. This differential in pressure establishes a force on the control piston 71 moving the valve member 36 to a closed position. This force together with the force of the spring 42 is sufficient to release the holding action of the spring biased ball 66 on the lever 19 and thus permitting a rapid and effective closing of the valve member 36.

As soon as the discharge end 34 of the nozzle unit 17 is moved from the liquid in the tank, chamber 91a is again in communication with the atmosphere. The spring 104 will then bias the diaphragm in an upward direction moving piston 98 to the closed position.

In terms of a method of dispensing liquid into a tank until the tank is substantially full of liquid the liquid is initially directed to chamber 24 and confined therein by the valve member 36 biased to the closed position. From the chamber 24 the liquid is directed into the control chamber 44 and trapped therein by the check valve 76. This trapped liquid in the chamber 44 flows to the opposite side of control piston 71 until an equilibrium of pressure is attained. The fluid flows around the periphery of the control piston 71 as it is in clearance relation with respect to the wall of the chamber 44. In addition check valve 72 permits rapid flow of fluid through the piston 71.

To dispense fluid into the tank the valve member 36 is releasably locked in the open position by the spring biased ball 66 acting on lever 19 thereby providing a continuous flow of liquid through the chamber 24 and nozzle unit 17 into the tank. As the fluid is discharged through chamber 24 and passages 31 and 32 of the nozzle unit 17 the pressure of the fluid in chamber 24 falls below the pressure of the fluid in the chamber 44 such that the fluid in control chamber 44 will flow into chamber 24. By regulating this flow the shut-off characteristics of the nozzle and valve assembly 15 are determined. By restricting the flow of liquid into the chamber 24 this pressure differential can be regulated as well as the flow of liquid discharged by the nozzle unit 17.

A vacuum is established in response to the flow of liquid through the valve nozzle unit 17. This vacuum is normally in communication with the atmosphere through the opening 113 in the end of the tubular neck 29 of the nozzle unit. When the opening 113 is closed or blocked by being below the level of the liquid in the tank the vacuum actuates the control mechanism 21 to permit flow of liquid from the chamber 44 into the chamber 24 establishing a pressure differential force on the opposite sides of the control piston 71 which is sufficient to close the valve member 26. This force is sufficient to release the lever 19 whereby the valve member 26 is biased to the closed position.

The control mechanism 22 shown in FIGURES 7 to 10 is operative to control the flow of fluid from chamber 44 into chamber 24. The valve housing 23 has a lateral boss 124 having a radial bore 126 open to the chamber 24 and the inlet bore 51. A cylindrical flow control valve 127 having a control knob 128 is rotatably disposed in the bore 126. The valve 127 is maintained in assembled relation with the boss 124 by a bolt 129 projected into an annular peripheral groove 131 in the valve body adjacent the knob 128. An O-ring 132 is retained in a suitable groove in the valve body below the groove 131 and engages the wall of the radial bore 126 to prevent the leakage of liquid from the valve housing 23.

As shown in FIGURES 6 and 8, a portion of the periphery of the control valve 127 has a semi-circular cut-out 133 extended upwardly at an angle of about 30° with respect to the bottom of the valve 127. The cut-out 133 has substantially the same angle as the inlet bore 51 when the valve 127 is turned so that the cut-out 133 faces the bore 51. In this position the cut-out 133 provides for maximum flow of liquid through the bore 51 into the chamber 24. As shown in FIGURE 8, the valve 127 is rotatable in the bore 126 so as to restrict the flow of liquid through the inlet bore 51. This flow is only partially restricted as the valve 127 does not block the inlet bore 51.

As shown in FIGURES 7 to 9, the control mechanism 22 has a selectable bleed system permitting limited flow of liquid from the chamber 44 into the chamber 24. Three longitudinal passages 134, 136 and 137 extend through the body of the valve 127. The lower section of each passage is enlarged and carries plugs 138, 139 and 141. These plugs have axial holes which vary in size with plug 138 having the largest hole and plug 141 having the smallest hole thereby providing each passage with different liquid metering characteristics. Radial passages 142, 143 and 144 shown in FIGURE 9 open into the longitudinal passages 134, 136 and 137 respectively and at their opposite ends to the periphery of the valve body 127.

The valve housing 23 has an opening 146 in the horizontal plane of the radial passages 142, 143 and 144. The radial passages are angularly spaced about 45° from each other, thus on rotation of the valve body 127 passages 142, 143 and 144 may be selectively aligned with the opening 146 whereby the flow rate of liquid moving from the chamber 44 into the chamber 24 may be changed.

As shown in FIGURE 7, a needle 147 having a pointed lower end is positioned in the longitudinal passage 134 above the radial passage 142. A plug 148 threaded into the enlarged top of the passage 134 is used to adjust the position of the needle 147 with respect to the plug 138. This adjustment provides further regulation of the flow of liquid through the passage 142 and the hole in the plug 138. As seen in FIGURE 10 the longitudinal passages 136 and 137 have identical needles and plugs 148a and 148b for regulating the flow characteristics of each passage.

When it is desired to meter selected dollar amounts of liquid fuel the control valve 127 is rotated until one of the radial passages 142, 143 or 144 is in alignment with the opening 146 whereby the liquid in the chamber 44 moves at a selected rate into the chamber 24 dependent upon the bleed characteristic of the selected passage. The knob 128 as shown in FIGURE 5 has indicator marks 149 which when aligned with a reference mark on the valve housing 23 provide a visual indication of the angular position of the control valve 127 so that a selected dollar amount of fuel may be discharged into the tank. When the metering system is used the cut-out 133 is in a position such that the body of the valve 127 partially closes the inlet passage 51 whereby a restricted or slow flow rate of liquid moves into the chamber 24. When the cut-out 133 is in substantially axial alignment with the passage 51 the radial passages 142, 143 and 144 are not in alignment with the opening 146 thereby making the liquid bleed system 22 ineffective. When this is done the valve and nozzle assembly 15 is used to fill the container and automatically shut-off by the operation of the vacuum operated control mechanism 21.

In use, to dispense selected dollar amounts of liquid fuel into a tank the knob 128 is initially rotated until one of the indicator marks 149 is in alignment with the reference mark. For example, the middle indicator mark represents $2.00 worth of liquid fuel and the first indicator mark represents $3.00 worth of liquid fuel. The first indicator mark represents an angular position wherein the radial passage 142 is in alignment with the opening 146. The attendant then places the tubular neck 29 of the nozzle unit 17 into the top of the tank or the delivery spout to the tank. The dispensing of fuel is commenced on movement of the lever 19 toward the handle 52. To continue the discharge of liquid into the tank the lever 19 is moved into locking engagement with the ball 66 at the end of the handle 52. The movement of the lever 19 moves the rod 38 in a rearward direction opening the valve member 36 and moving the control piston 71 toward the timer piston 78.

Referring to FIGURE 3, the fuel supplied to the inlet end of the chamber 24 flows through the passage 49 into the inlet passage 51. The flow control valve 127 restricts the flow of fuel into the chamber 24. With the valve member 36 in the open position as shown in FIGURE 7 and in FIGURE 1 in broken lines the fuel in the chamber 24 flows through the nozzle passages 31 and 32 opening the check valve 119. From the check valve 119 the liquid is dispensed into the tank through passage 33 formed by the tubular neck 29.

Referring to FIGURE 1 it is seen that the chamber 44 is initially filled with fuel which flows from the chamber 24 through the check valve 76. Since the control piston 71 has a check valve 72 and is in a clearance relation with respect to the walls of the chamber 44 the liquid will flow on opposite sides of the piston 71 and have substantially the line pressure of the liquid supplied to the valve and nozzle assembly 15. Under these conditions the spring 87 biases the timer piston 78 into engagement with the rear-end wall of the member 43.

As the liquid is dispensed from the nozzle unit 17 the check valve 76 is closed and the liquid in the chamber 44 slowly bleeds through the passage 142 and the hole and the plug 138 into the chamber 24. This reduces the pressure of the liquid in the chamber 44 thus enabling the timing piston 78 to slowly move toward the control piston 71 compressing the spring 87 as shown in FIGURE 6. As the liquid in the chamber 44 bleeds into the chamber 24 the pressure of the liquid in the chamber is reduced. This permits the timing piston 78 to move toward the control piston 71 and apply increasing pressure thereto through the spring 87. The force on the control piston 71 increases over a period of time and eventually is sufficient to overcome the holding force of the spring biased ball 66 on the handle 19 so as to move the handle 19 from a locked relationship with respect to the ball. When this happens the valve member 36 is snapped to the closed position under the biasing force of the spring 42 and thereby terminating the dispensing of liquid into the tank.

The bleed characteristic of the passage 142 is adjusted with respect to the discharge rate of fuel from the nozzle unit such that approximately $1.00's worth of fuel is dispensed before the valve member 36 is moved to the closed position. This is accomplished by selecting the size of the hole in the plug 138 and in addition by adjusting the needle 147 to vary the flow characteristic of the liquid moving through the hole in plug 138. In the same manner the holes in plugs 139 and 141 are selected to provide different flow rates changing the amount of liquid dispensed into the tank. These flow rates are adjusted with flow restricting needles similar to needle 147.

In use, the supply hose is connected to the base 47 and carries liquid under pressure from a source, such as a pump, to the valve and nozzle assembly 15. The liquid supplied to the valve and nozzle assembly is directed into a first chamber 24 and a second chamber 44 at substantially equal pressure through check valve 76. The liquid in the second chamber flows to opposite sides of control piston 91 and thereby is on opposite sides of timer piston 78.

The control knob 128 is first rotated to a position corresponding to the amount of liquid to be discharged into a tank. The neck 29 of the nozzle unit 17 is then inserted into the top of the tank or the filling spout of the tank and the lever 19 is pivoted into the handle groove 53 and locked in this position. The lever 19 moves the rod 38 in a rearward direction opening valve 36. The supply of liquid is discharged from the first chamber 24 by opening valve member 36 whereby liquid under pressure from the supply flows through the passage 49, the inlet passage 51, chamber 24 and out through the passages 31, 32 and 33 in the nozzle unit 17 into the tank. The valve member 36 is releasably locked in the open position to provide a continuous flow of liquid through the chamber 24 into the nozzle unit 17. This flow of the liquid into the chamber 24 is restricted by the body of the valve member 127 whereby the pressure in the passage 49 and inlet end of the chamber 44 is greater than the pressure in the first chamber 24.

The duration of dispensing of liquid from the nozzle unit 17 is regulated by restricting the flow of liquid from the second chamber 44 into the first chamber 24. This restricted flow is selected according to the desired dollar amount of liquid dispensed from the nozzle unit 17. As the liquid in the chamber 44 flows into the chamber 24 the volume of the liquid in the chamber 44 decreases along with the pressure of the liquid therein causing the timer piston 78 to apply a force which increases with time on the control piston 71. This force increases until the holding force on the lever 19 is released. At this time the valve member 36 automatically closes under the biasing force of the spring 42. The result is that the valve member 36 closes after a predetermined time representative of the discharge rate of liquid through the nozzle unit 17 such that the valve unit 36 closes immediately prior to the selected dollar amount of liquid.

In terms of a method for dispensing a predetermined volume of liquid into a tank, such as $1.00's worth of gasoline, the liquid is initially supplied under pressure to a first chamber 24 and one end of a second chamber 44. The second chamber 44 is divided with a timer piston 78 having one side subject to the pressure of the liquid supply. Liquid is trapped in the chamber 44 on the other side of the timer piston 78. This is achieved by providing one-way flow of liquid by check valve 76 from chamber 24 to chamber 44. The trapped liquid flows to the opposite side of control piston 71 until an equilibrium of pressure is attained.

Liquid is dispensed into the tank by allowing liquid to flow through chamber 24 and into passages 31, 32 and 33 of the nozzle unit 17. Liquid flows through chamber 24 when the valve member 36 is releasably locked in the open position by the spring biased ball 66 acting on the lever 19. The rate of flow is adjusted by restricting the flow of liquid into the chamber 24. This is accomplished by the restrictor valve 127. As liquid flows through chamber 24 the trapped liquid is bled from chamber 44 back to chamber 24 at a controlled rate correlated to the discharge rate of liquid flowing into the tank. In this manner the bleed rate directly controls the volume of liquid discharged into the tank.

When the trapped liquid is bled from chamber 44 the timer piston 78 being subject to the pressure of the liquid supply moves toward the control piston 71 establishing a force which increases with time on the control piston 71. This force increases until the lever 19 is released from the holding action of the spring biased ball 66. When lever 19 is released valve member 26 is biased by spring 42 to the closed position thereby terminating the dispensing of liquid into the tank. The rate at which the force increases on the control piston 71 depends upon the rate at which liquid is bled from chamber 44. Thus, by controlling this bleed rate predetermined volumes of liquid can be dispensed into a tank.

Figure 11:
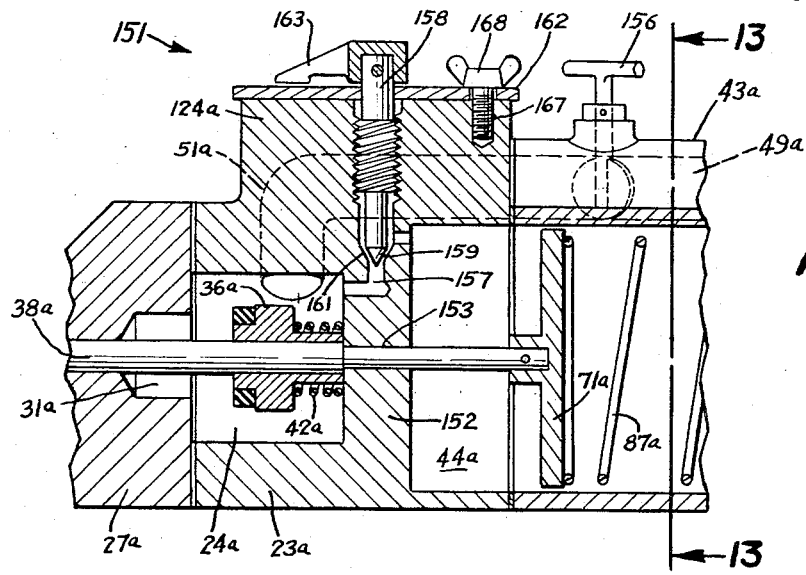
FIGURE 11 is a fragmentary elevational view partly in section showing a modified fluid delay control mechanism usable with the nozzle and valve assembly of FIGURE 1.
Figure 12:
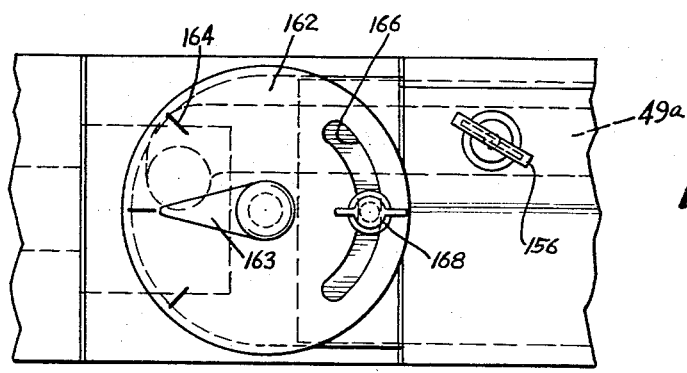
FIGURE 12 is a plan view of FIGURE 11.
Figure 13:
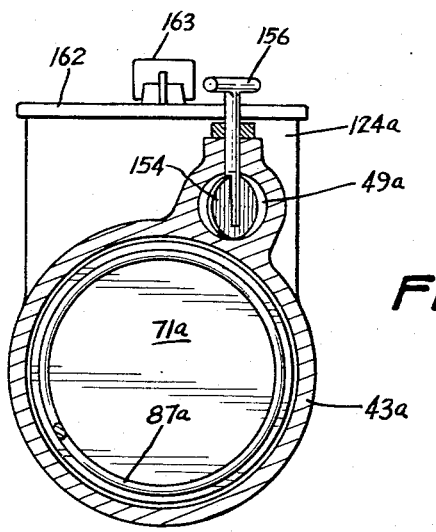
FIGURE 13 is a sectional view taken along the line 13—13 of FIGURE 11.

Referring to FIGURES 11, 12 and 13 there is shown a modified fluid delay control mechanism 151 for adjusting the rate of flow of liquid from the chamber 44 into the chamber 24. In this modification of the valve and nozzle assembly the parts which correspond to the valve and nozzle assembly 15 are indicated with the same reference numeral having the suffix a.

The valve housing 23a, has a transverse wall 152 separating the chamber 24a from the chamber 44a. This wall replaces the plug 26 as shown in FIGURE 1. The rod 38a projects through a bore 153 in the wall and is attached to the control piston 71a. A one way check valve (not shown) is positioned in the wall 152 and permits the flow of liquid from the chamber 24a into the chamber 44a in a manner similar to the check valve 76 shown in FIGURE 1.

The flow of liquid in the passage 49a is regulated by a disc valve 154 secured to a T member 156 rotatably mounted in the wall of the cylindrical member 43a. The T member 156 is manually rotated to change the angular position of the disc valve 54 with respect to the passage 49a and thereby restrict flow of liquid into the inlet passage 51a and chamber 24a.

The valve housing 23a has a step passage 157 open at one end to the chamber 24a and at the opposite end to the chamber 44a. The liquid in the chamber 44a flows through the passage 157 into the chamber 24a. This flow is regulated by a needle valve 158 threaded for axial movement in a threaded bore in the boss 124a. The needle valve 158 has a point 159 which is adjustable relative to a conical face 161 forming part of the passage 157 to change the liquid flow characteristics of the passage 157. The upper end of the needle valve 158 projects through a disc 162 mounted on the top of the boss 124a. A combined handle and pointer arm 163 is secured to the top end of the needle valve 158 and projects radially of the disc 162.

As shown in FIGURE 12, the disc 162 has a plurality of spaced indicia marks 164 which are used to indicate dollar amounts or gallon amounts of liquid dispensed by the valve and nozzle assembly. The position of the indicia 164 may be changed relative to the arm 163 by rotating the disc 162 about the axis of the needle valve 158. As shown in FIGURE 12 the disc has an arcuate slot 166 concentric with a threaded bore 167 in the boss 124a. A bolt 168 having a wing head threaded into the bore 167 is used to hold the disc 162 in an adjusted position. The disc 162 may be readjusted by loosening the bolt 168 and rotating the disc to the desired position.

The rate of flow of liquid from the chamber 44a into the chamber 24a is varied by rotating the handle and pointer arm 163 to either increase the space or decrease the space between the needle point 159 and the conical surface 161. The larger the space between the needle point and the adjacent conical surface 161 the more fluid per unit of time will flow through the passage 157 thereby shortening the dispensing time limiting the dispensing of liquid into the tank to a small amount such as $1.00 in value. In order words, the time piston will quickly increase the force on the control piston 71a and release the holding action of the lever 19a whereby the valve member 36a will be biased to a closed position by the spring 42a.

In the modified control mechanism 151 a single needle valve 158 is used to determine the selected dollar amounts of liquid dispensed by the nozzle assembly. This is accomplished by adjusting the rate of flow of liquid from the control chamber 44a into the chamber 24a. It is understood that the modified valve adjustable bleed control mechanism 151 may be used with the vacuum operated control mechanism 21 as shown in FIGURE 1.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A nozzle and valve assembly for dispensing selected amounts of liquid into a container comprising:
   (a) a valve unit having a first chamber in communication with a supply of liquid under pressure and a valve member biased to a closed position to block the flow of liquid from said chamber and movable to an open position to permit the flow of liquid through said chamber,
   (b) a nozzle unit secured to the valve unit, said nozzle unit having passage means for carrying liquid from the first chamber for discharge into the container,
   (c) a handle secured to the valve unit,
   (d) a lever pivotally mounted on the handle and connected to the valve member whereby movement of the lever carries the valve member to the open position,
   (e) releasable lock means for holding the lever in a position wherein the valve member is in the open position,
   (f) a member having a second chamber secured to the valve unit,
   (g) a check valve operative to only allow the flow of liquid from the first chamber into the second chamber,
   (h) a control piston positioned in said second chamber with liquid on opposite sides thereof,
   (i) means connecting the control piston with the valve member,
   (j) a timer piston slidably disposed in said second chamber with the side opposite the control piston in communication with the supply of liquid under pressure,
   (k) spring means positioned in said second chamber in engagement with said control piston and timer piston, and
   (l) bleed means providing restricted flow of liquid from the second chamber to the first chamber whereby the timer piston moves toward the control piston exerting a continuously increasing force on the control piston which after a period of time dependent upon the flow rate of the bleed means releases the lock means holding the lever whereby said valve member is biased to the closed position.

2. The nozzle and valve assembly of claim 1 wherein said bleed means includes:
   (a) a rotatable cylindrical valve having a plurality of passages open to the first chamber and selectively open to the second chamber,
   (b) means in each passage for restricting the flow of liquid through said passage.

3. The nozzle and valve assembly of claim 1 wherein said bleed means includes:
   (a) a rotatable valve having at least one passage open at one end to the first chamber and selectively open at the other end to the second chamber,
   (b) plug means having a flow restricting bore positioned in said one end of the passage,
   (c) needle means movably disposed in said valve for adjusting the rate of flow of liquid in said passage.

4. The nozzle and valve assembly of claim 1 wherein said bleed means includes:
   (a) passage means open to the first chamber and open to the second chamber, and
   (b) needle valve means carried by the valve unit having an end movable into said passage means to adjustably restrict the flow of liquid through said passage means.

5. A nozzle and valve assembly for dispensing selected amounts of liquid into a container comprising:
   (a) a valve unit having a first chamber in communication with a supply of liquid under pressure and a valve member biased to a closed position to block the flow of liquid from said chamber and movable to an open position to permit the flow of liquid through said chamber,
   (b) a nozzle unit secured to the valve unit, said nozzle unit having passage means for carrying liquid from the first chamber for discharge into the container,
   (c) a handle secured to the valve unit,
   (d) a lever pivotally mounted on the handle and connected to the valve member whereby movement of the lever carries the valve member to the open position,
   (e) releasable lock means for holding the lever in a position wherein the valve member is in the open position,
   (f) a member having a second chamber secured to the valve unit,
   (g) a check valve operative to only allow the flow of liquid from the supply of liquid into the second chamber,
   (h) a control piston positioned in said second chamber with liquid on opposite sides thereof,
   (i) means connecting the control piston with the valve member,
   (j) a timer piston slidably disposed in said second chamber with the side opposite the control piston in communication with the supply of liquid under pressure,
   (k) resilient means positioned in said second chamber in engagement with said control piston and timer piston, and
   (l) bleed means providing restricted flow of liquid from the second chamber whereby the timer piston moves toward the control piston exerting a continuously increasing force on the control piston which after a period of time dependent upon the flow rate of the bleed means releases the lock means holding the lever whereby said valve member is biased to the closed position.

6. A control mechanism for a valve unit comprising:
   (a) a valve body having an end wall and a first chamber adapted to be in communication with a supply of liquid under pressure,
   (b) a valve member positioned in said first chamber and movable to a first positon to block the flow of liquid from the first chamber and movable to a second position to permit flow of liquid from said first chamber,
   (c) lock means for releasably holding the valve member in the second position,
   (d) means for biasing the valve member to the closed position,
   (e) a member having a second chamber secured to the valve body with said end wall separating the first and second chambers,
   (f) control piston means positioned in said second chamber,
   (g) rod means slidably mounted on said end wall and connected to said valve member and control piston means,

13

(h) check valve means operable to allow flow of liquid from the first chamber into the second chamber,
(i) timer piston means slidably positioned in said second chamber with one side thereof in communication with the supply of liquid under pressure,
(j) resilient means connecting the timer piston means with the control piston means, and
(k) bleed means for controlling the flow of liquid from the second chamber to the first chamber whereby the timer piston applies a force on the control piston to urge the valve member toward the first position with a force sufficient to overcome the holding action of the lock means on the valve member.

7. The nozzle and valve assembly of claim 6 wherein said bleed means includes:
(a) a rotatable cylindrical valve having a plurality of passages open to the first chamber and selectively open to the second chamber,
(b) means in each passage for restricting the flow of liquid through said passage.

8. The nozzle and valve assembly of claim 6 wherein said bleed means includes:
(a) a rotatable valve having at least one passage open at one end to the first chamber and selectively open at the other end to the second chamber,
(b) plug means having a flow restricting bore positioned in said one end of the passage,
(c) needle means movably disposed in said valve for adjusting the rate of flow of liquid in said passage.

9. The nozzle and valve assembly of claim 6 wherein said bleed means includes:
(a) passage means open to the first chamber and open to the second chamber, and
(b) needle valve means carried by the valve unit having an end movable into said passage means to adjustably restrict the flow of liquid through said passage means.

10. A control mechanism for a valve unit comprising:
(a) a valve body having an end wall and a first chamber adapted to be in communication with a supply of liquid under pressure,
(b) a valve member positioned in said first chamber and movable to a first position to block the flow of liquid from the first chamber and movable to a second position to permit flow of liquid from said first chamber,
(c) lock means for releasably holding the valve member in the second position,
(d) a member having a second chamber secured to the valve body with said end wall separating the first and second chambers,
(e) control piston means positioned in said second chamber,
(f) means slidably mounted on said eind wall and connected to said valve member and control piston means,
(g) check valve means operable to allow flow of liquid from the supply of liquid under pressure into the second chamber,
(h) timer piston means slidably positioned in said second chamber with one side thereof in communication with the supply of liquid under pressure,
(i) resilient means connecting the timer piston means with the control piston means, and
(j) bleed means for controlling the flow of liquid from the second chamber to the first chamber whereby the timer piston applies a force on the control piston to urge the valve member toward the first position with a force sufficient to overcome the holding action of the lock means on the valve member.

11. A control mechanism for a valve unit comprising:
(a) a valve body having an end wall and a first chamber adapted to be in communication with a supply of liquid under pressure,
(b) a valve member positioned in said first chamber and movable to a first position to block the flow of liquid from the first chamber and movable to a second position to permit flow of liquid from said first chamber,
(c) lock means for releasably holding the valve member in the second positon,
(d) means for biasing the valve member to the closed position,
(e) a member having a second chamber secured to the valve body with said end wall separating the first and second chambers,
(f) piston means positioned in said second chamber,
(g) rod means slidably mounted on said end wall and connected to said valve member and piston means,
(h) check valve means operable to allow flow of liquid from the first chamber into the second chamber,
(i) means for controlling the flow of liquid from the second chamber to the first chamber whereby the piston means urges the valve member toward the first position with a force sufficient to overcome the holding action of the lock means on the valve member.

12. A control mechanism for a valve unit comprising:
(a) a valve body having an end wall and a first chamber adapted to be in communication with a supply of liquid under pressure,
(b) a valve member positioned in said first chamber and movable to a first position to block the flow of liquid from the first chamber and movable to a second position to permit flow of liquid from said first chamber,
(c) lock means for releasably holding the valve member in the second position,
(d) a member having a second chamber secured to the valve body with said end wall separating the first and second chambers,
(e) piston means positioned in said second chamber,
(f) means slidably mounted on said end wall and connected to said valve member and piston means,
(g) check valve means operable to allow flow of liquid from the supply into the second chamber,
(h) means for controlling the flow of liquid from the second chamber whereby the piston means urges the valve member toward the first position with a force sufficient to overcome the holding action of the lock means on the valve member.

13. The control mechanism defined in claim 12 wherein the means for controlling the flow of liquid from the second chamber includes:
(a) valve means movable to open and closed positions to control the flow of liquid from the second chamber,
(b) means to bias the valve means to the closed position,
(c) diaphragm means connected to said valve means,
(d) means for establishing a source of vacuum,
(e) passage means coupling said vacuum in fluid communication with the atmosphere, said passage means having one end positioned adjacent the discharge end of the valve body and the opposite end open to said diaphragm means,
(f) said diaphragm means operable by the vacuum to move the valve means to the open position when the level of the liquid raises above the discharge end of the valve unit thereby permitting flow of liquid from the second chamber reducing the pressure of the liquid on one side of the piston means so that the pressure of the liquid on the opposite side of the piston means forces the valve member to the closed position thereby terminating the flow of liquid from the valve unit.

14. The nozzle and valve assembly defined in claim 13 including:
(a) releasable lock means for holding the lever in a position wherein the valve member is in the open position.

15. A control mechanism for a valve unit comprising:
(a) a valve body having an end wall and a first chamber adapted to be in communication with a supply of liquid under pressure,
(b) a valve member positioned in said first chamber and movable to a first position to block the flow of liquid from the first chamber and movable to a second position to permit flow of liquid from said first chamber,
(c) lock means for releasably holding the valve member in the second position,
(d) means for biasing the valve member to the closed position,
(e) a member having a second chamber secured to the valve body with said end wall separating the first and second chambers,
(f) control piston means positioned in said second chamber,
(g) means slidably mounted on said end wall and connected to said valve member and piston means,
(h) check valve means operable to allow flow of liquid from the supply of liquid under pressure into the second chamber,
(i) timer piston means slidably positioned in said second chamber with one side thereof in communication with the supply of liquid under pressure,
(j) resilient means connecting the timer piston means with the control piston means, and
(k) valve means for controlling the flow of liquid from the second chamber to the first chamber whereby the timer piston applies a force on the control piston to urge the valve member toward the first position with a force sufficient to overcome the holding action of the lock means on the valve member.

16. The control mechanism defined in claim 15 including:
(a) a control mechanism operable to move the valve means to open and closed positions including
(1) means for establishing a source of vacuum,
(2) passage means coupling said vacuum in communication with the atmosphere, said passage means having one end positioned adjacent the discharge section of the valve unit,
(3) vacuum operated diaphragm means connected to said valve means and said passage means,
(4) said diaphragm means operable by the vacuum to move the valve means to the open position when the level of the liquid raises above the discharge end of the valve unit thereby permitting flow of liquid from the second chamber reducing the pressure of the liquid on one side of the control piston means so that the pressure of the liquid on the opposite side of the control piston means is in conjunction with the force applied thereto by the timer piston means forces the valve member toward the closed position thereby terminating the flow of liquid from the valve unit.

17. A valve assembly for dispensing selected amounts of liquid comprising:
(a) a valve unit having a first chamber in communication with a supply of liquid under pressure and a valve member biased to a closed position to block the flow of liquid from said chamber and movable to an open position to permit the flow of liquid through said chamber.
(b) a member having a second chamber secured to the valve unit,
(c) a control piston positioned in said second chamber with liquid on opposite sides thereof,
(d) means connecting the control piston with the valve member,
(e) a timer piston slidably disposed in said second chamber with the side opposite the control piston in communication with the supply of liquid under pressure, and
(f) bleed means providing restricted flow of liquid from the second chamber to the first chamber whereby the timer piston moves toward the control piston exerting a continuously increasing force on the control piston which after a period of time dependent upon the flow rate of the bleed means biases said valve member to the closed position.

References Cited

UNITED STATES PATENTS

| | | | |
|---|---|---|---|
| 587,786 | 8/1897 | Brown | 251—33 |
| 731,452 | 6/1903 | Hamfeldt | 251—279 X |
| 2,527,760 | 10/1950 | Piquerez | 141—206 |
| 3,060,978 | 10/1962 | Botkin | 141—206 X |
| 3,143,134 | 8/1964 | Karpis | 137—486 |
| 3,251,507 | 5/1966 | Murray | 141—225 X |

LAVERNE D. GEIGER, *Primary Examiner.*

H. S. BELL, *Assistant Examiner.*

UNITED STATES PATENT OFFICE
CERTIFICATE OF CORRECTION

Patent No. 3,370,623                 February 27, 1968

Robert W. Murray

It is certified that error appears in the above identified patent and that said Letters Patent are hereby corrected as shown below:

Column 10, line 73, for "order" read -- other --; column 11, line 26, for "until" read -- unit --; column 13, line 54, for "eind" read -- end --.

Signed and sealed this 24th day of June 1969.

EAL)

test:

ward M. Fletcher, Jr.                 WILLIAM E. SCHUYLER, JR.

testing Officer                         Commissioner of Patents